UNITED STATES PATENT OFFICE.

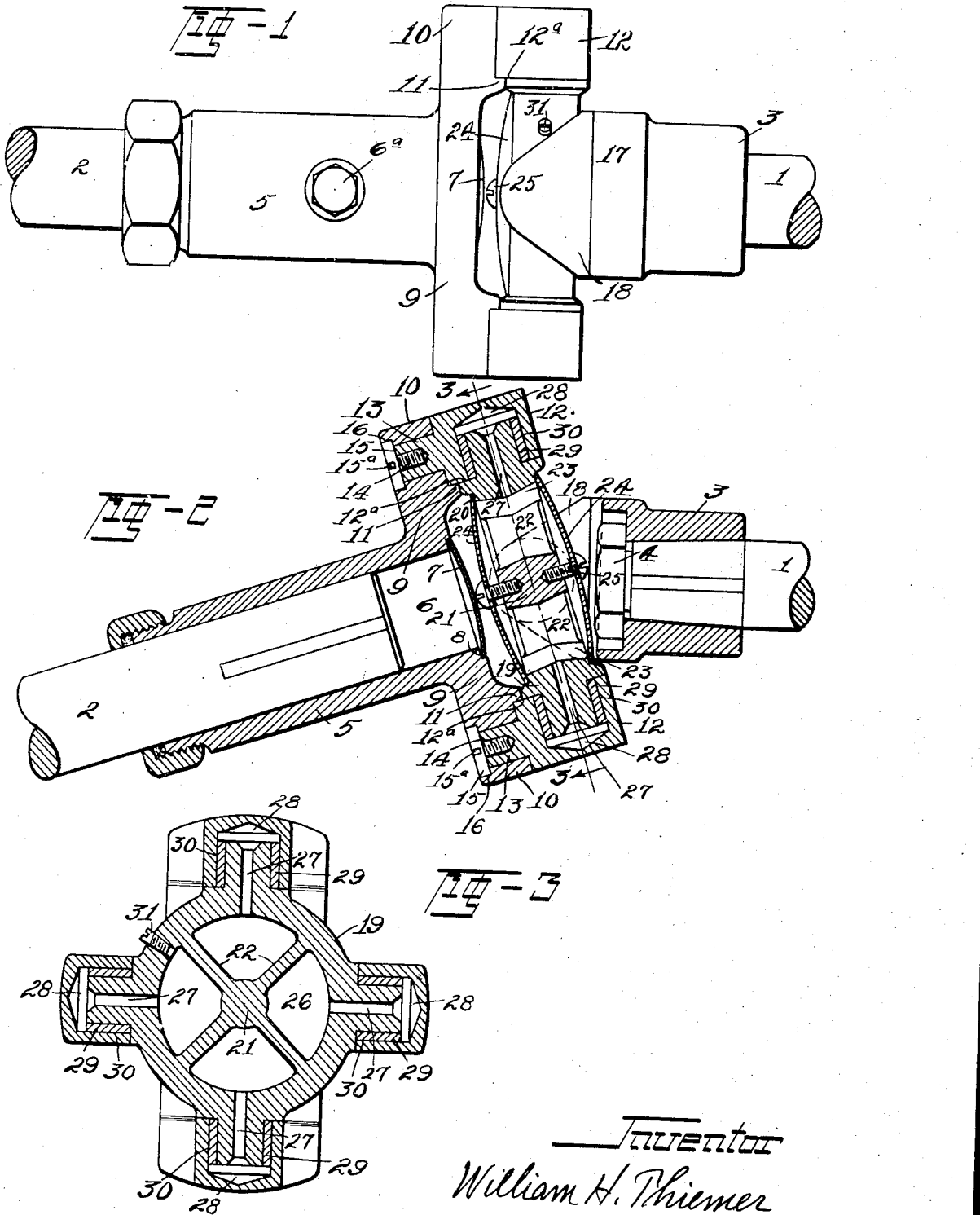

WILLIAM H. THIEMER, OF CLEVELAND, OHIO, ASSIGNOR TO THE PETERS MACHINE AND MANUFACTURING COMPANY, OF CLEVELAND, OHIO, A CORPORATION OF OHIO.

UNIVERSAL JOINT.

1,324,480.  Specification of Letters Patent.  Patented Dec. 9, 1919.

Application filed March 14, 1919.  Serial No. 282,559.

*To all whom it may concern:*

Be it known that I, WILLIAM H. THIEMER, a citizen of the United States, residing at Cleveland, in the county of Cuyahoga and State of Ohio, have invented a certain new and useful Improvement in Universal Joints, of which the following is a full, clear, and exact description, reference being had to the accompanying drawings.

This invention relates to universal joints and has for its general object to produce a joint of this character wherein novel and effective means are provided for lubricating, by centrifugal action, the journals or bearings for the trunnions. I realize this object in and through the construction shown in the drawings forming part hereof and wherein Figure 1 represents a side elevation of such joint, together with its operating parts; Fig. 2 a central longitudinal sectional view through such joint and parts, certain of the parts being shown in elevation; and Fig. 3 a transverse sectional view corresponding to the line 3—3 of Fig. 2.

Describing by reference characters the various parts illustrated herein, 1 and 2 denote the end portions of shaft sections connected by my joint. The shaft section 1 is provided with a hub 3 which may be splined thereto, the hub being shown as provided with a tapered bore for the reception of the correspondingly tapered portion of the shaft end. At its extreme end, the shaft section is reduced and threaded for the reception of a nut 4 by means of which and the spline it is connected to the hub. The shaft section 2 is also splined to an elongated hub 5 which is shown as extending beyond the end of the shaft and providing therefor a lubricant well 6 having a filling opening closed by a removable plug 6ª and closed at its outer end by means of a concavo-convex plate 7 forced to a seat 8, said plate being preferably what is known to the trade as a "Welch plug". Extending transversely of the inner end of the hub is a supporting base or flange 9 having at each end thereof a flanged projection 10 which is faced off and machined to provide an accurate seat for for the base of a bearing block, being provided with a shoulder 11 which is adapted to bear against and aline the adjacent side 12ª of the bearing block 12 with reference to a trunnion of the cross member. Each block is provided with a stud 13 projecting from the base thereof into and nearly through a bore in the outer end of the base flange 9, the stud making a snug fit with said bore and being internally threaded to receive a stud bolt 14. Each stud bolt 14 is provided with a cylindrical head 15 adapted, when the bolt is screwed home, to fit within an annular recess 16 formed within the bottom of each flanged projection of the base and constituting an enlargement of the bore thereof. The annular recesses 16 are preferably each of the same depth as the heads 15, whereby the bottoms of said heads will be substantially flush with the bottoms of their respective flanged projections. Each bolt head may be slotted, as shown at 15ª, for the reception of a screw driver and, when the bolts are set up, they may be retained in place by merely staking or peening the metal at the base of the flanged projections into one or both ends of each slot.

The hub 3 is provided with a base 17 similar to the base 9 and having seats for blocks 18 similar in construction and arrangement to the corresponding parts carried by the hub 5.

The rotatable cross member comprises a ring 19 having an annular seat 20 at each side thereof, a central hub 21 and radial arms 22 connecting said hub and the inner surface of the ring. The ring, the hub, and the arms are preferably formed as a casting and, in order to permit the convenient drawing of the casting, the hub is reversely tapered from the center toward the ends while the inner wall of the cup is also tapered, but in the reverse direction from the the hub, as indicated at 23.

A pair of cover plates 24 are shown for the opposite side of the ring, the cover plates forming with said ring a central well from which lubricant may be distributed by centrifugal action through ports to the bearings. These plates may be of the "Welch plug" type, being concavo-convex and having their peripheries respectively fitted within the seats 20. By springing the centers of the plates inwardly or toward each other, they will ordinarily be retained within their seats. However, in the event that covers of this kind are not employed, or in the event that additional security is desired, the hub 21 affords a convenient means for securing these cover plates in place, as by means of screws 25 each extending through a cover plate and threaded into the hub.

It will be observed that the ribs are of less width than the length of the hub and the width of the ring 19. This is for the purpose of facilitating the distribution of the lubricant. In the event that flat cover plates are employed, there will still be sufficient space between the inner surfaces of the same and the ribs to permit the distribution of the lubricant from one of the spaces or chambers provided between adjacent ribs and the cover plates to the other spaces or chambers, and thence to the bearings.

By the arrangement of the ribs 22 shown herein, four chambers 26 are provided, communicating with each other through the spaces between the ribs and the cover plates, and each communicating with a radial port 27 extending from the well outwardly through a trunnion to a well 28 in a bearing block, whence it is distributed to the trunnion bearing by centrifugal action, a bushing 29 being shown as interposed between each trunnion and the bore 30 of its block. Lubricant for the well may be supplied through an opening provided in the ring 19 and having its inner end communicating with one of the chambers 26, said opening being closed by a screw plug 31.

The particular construction of the flanged bases, the bearing blocks, and the manner of mounting the journals in the same do not in their details constitute any part of my invention, the arrangement shown herein being substantially identical with that embodied in the application of Frederick W. Peters Serial No. 275,503 filed February 7, 1919.

In operation, the lubricant well having been filled, the material therein will, through centrifugal action, be distributed outwardly through the radial ports 27 and into the wells 28, whence it will be distributed to the journals.

Having thus described my invention, what I claim is:—

1. In a device of the character described, the combination of a rotatable member having trunnions projecting therefrom, bearings for said trunnions, ports for conducting lubricant from said member to said bearings, arms formed with said member and projecting inwardly therefrom, a hub to which said arms are connected, a cover plate for said member secured to said hub, means whereby lubricant may be supplied to the space between a pair of said arms, and means whereby the lubricant in such space may be supplied therefrom to the spaces provided between the other arms and the cover plate and therefrom to the said ports.

2. In a device of the character described, the combination of a rotatable member comprising a ring having trunnions projecting therefrom, bearings for said trunnions, ports extending from said ring to said bearings, arms formed with said ring and projecting radially inwardly therefrom, a central hub to which said arms are connected, cover plates for opposite sides of said ring and secured to said hub, means whereby lubricant may be supplied to the space between a pair of said arms, and means whereby the lubricant in such space may be supplied therefrom to the spaces provided between the other arms and the cover plates and therefrom to the said ports.

3. In a device of the character described, the combination of a rotatable ring having trunnions projecting therefrom, bearings for trunnions projecting therefrom, there being ports extending said trunnions, there being ports extending through said ring to said bearings, said ring being provided on opposite sides thereof with annular seats arms projecting inwardly from said ring, a hub to which the inner ends of said arms are connected, cover plates having their peripheral portions fitted in said seats and secured to said hub, and means whereby lubricant may be supplied to the space provided between a pair of adjacent ribs, portions of said ribs being of less width than the said ring, whereby lubricant supplied to such space may be distributed to the other spaces formed between said ribs and therefrom to said ports.

4. In a device of the character described, the combination of a rotatable ring having trunnions projecting therefrom, bearings for said trunnions, there being ports extending through said ring to said bearings, a well within said ring, said well being divided into communicating chambers with which said ports communicate and means whereby lubricant may be supplied to one of said chambers and therefrom to the other chambers.

5. In a device of the character described, the combination of a rotatable ring having trunnions projecting therefrom, bearings for said trunnions, ports extending through said ring and to said bearings, said ring having at one side thereof a seat, a cover fitted in said seat, means within said ring forming a plurality of communicating chambers therewithin, and means whereby lubricant may be supplied to one of said chambers, each chamber communicating with a port.

6. In a device of the character described, the combination of a rotatable member having trunnions projecting therefrom, bearings for said trunnions, ports extending outwardly from the interior of said member to said bearings, means providing within said rotatable member a plurality of chambers, means whereby lubricant may be introduced into one of said chambers, and means whereby the lubricant thus introduced into such chamber may be distributed into the other chambers and thence through said ports.

In testimony whereof, I hereunto affix my signature.

WILLIAM H. THIEMER.